May 22, 1962 L. S. WILLIAMS 3,035,649
LEVER CONNECTION
Filed April 29, 1957 7 Sheets-Sheet 1
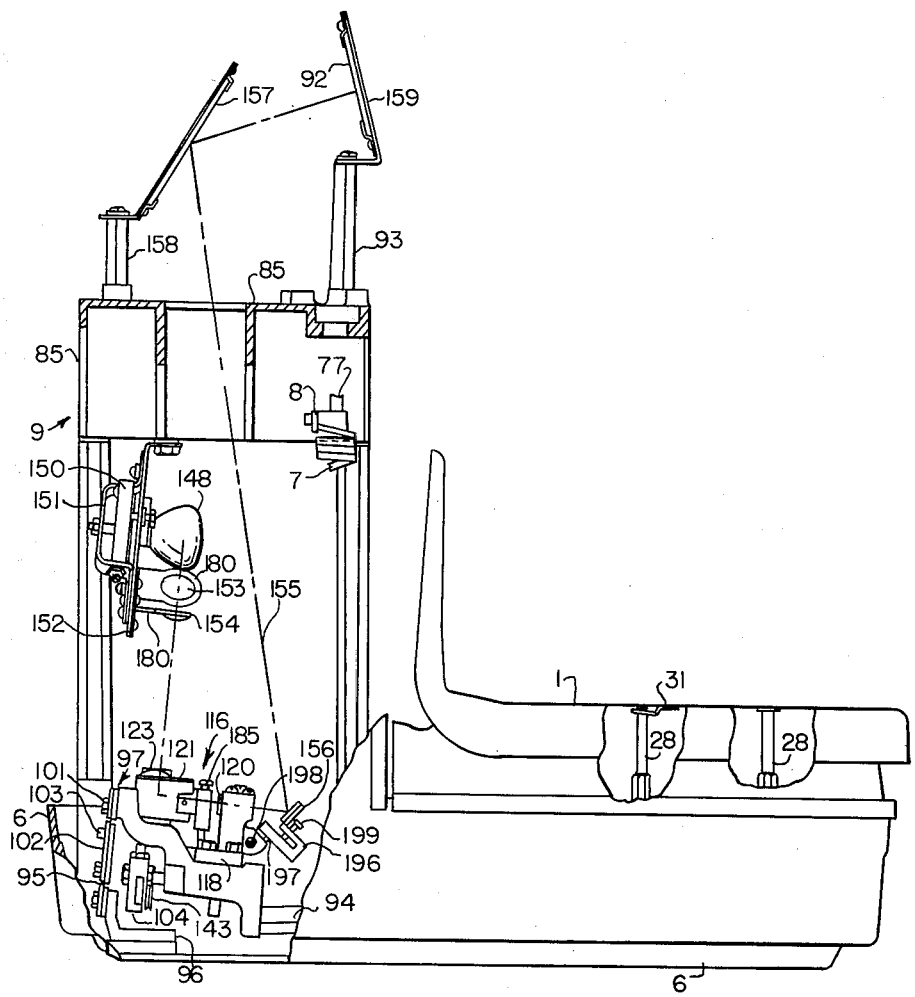
Fig-I
INVENTOR.
LAWRENCE S. WILLIAMS
BY
Marshall, Marshall & Yeasting
ATTORNEYS May 22, 1962  L. S. WILLIAMS  3,035,649
LEVER CONNECTION
Filed April 29, 1957  7 Sheets-Sheet 2
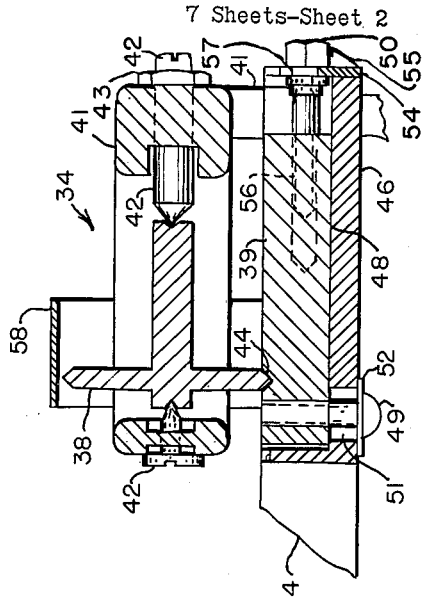
Fig. III
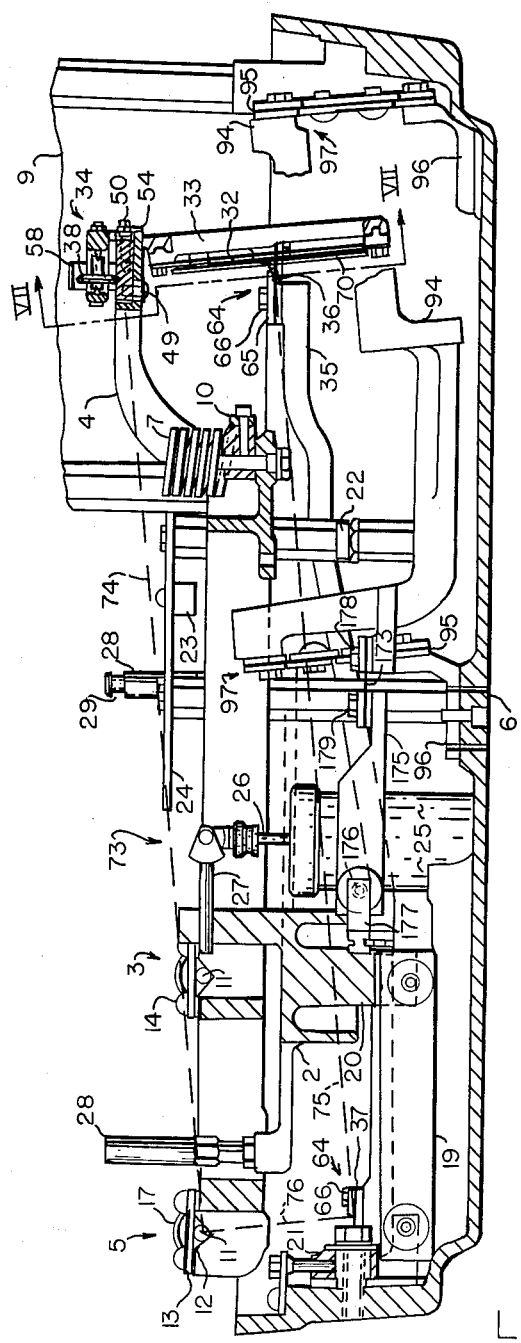
Fig. II
INVENTOR.
LAWRENCE S. WILLIAMS
BY
Marshall, Marshall & Keating
ATTORNEYS

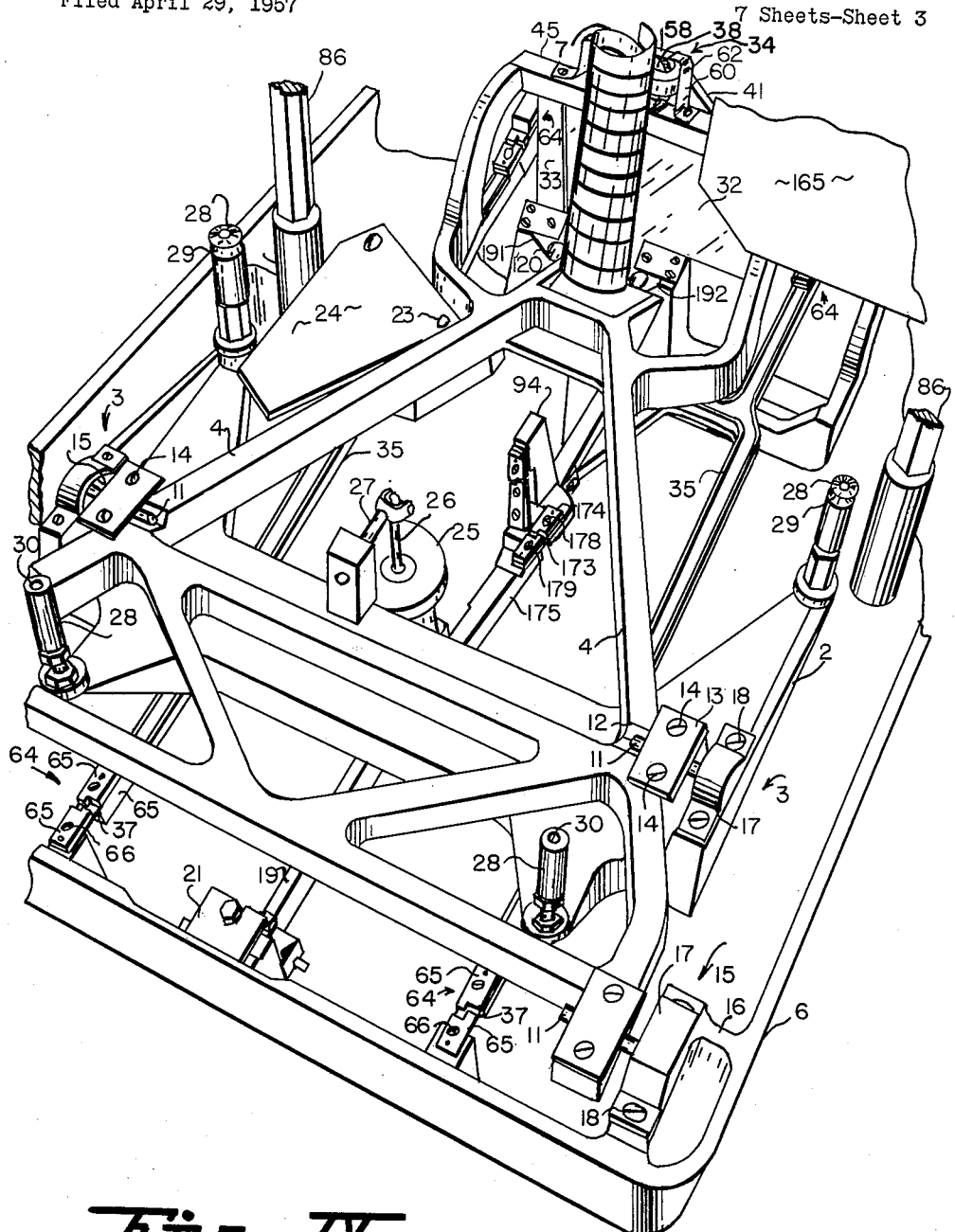
Fig. IV

May 22, 1962  L. S. WILLIAMS  3,035,649
LEVER CONNECTION
Filed April 29, 1957  7 Sheets-Sheet 4
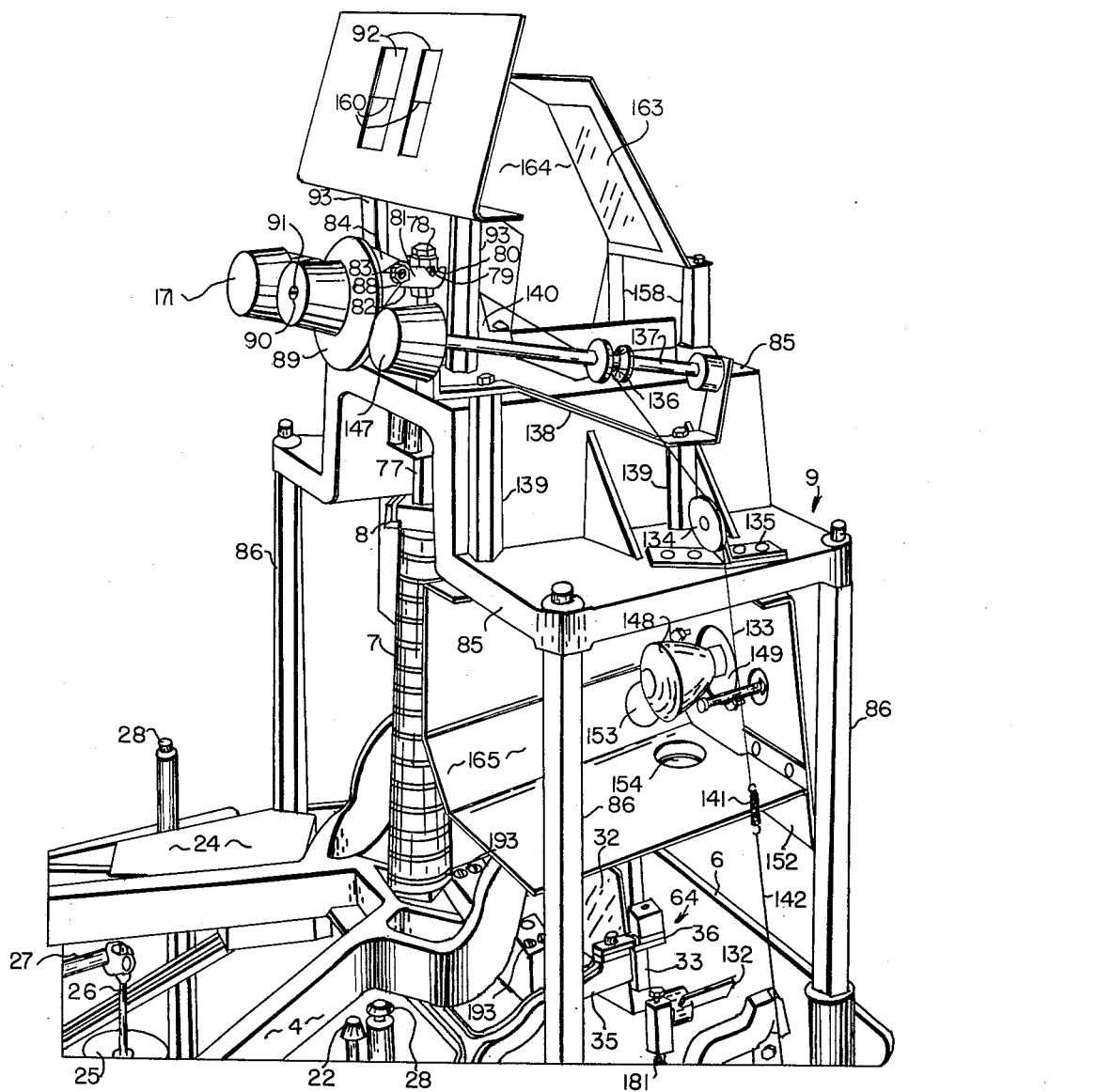
Fig-V
INVENTOR.
LAWRENCE S. WILLIAMS
BY
Marshall, Marshall & Yeasting
ATTORNEYS

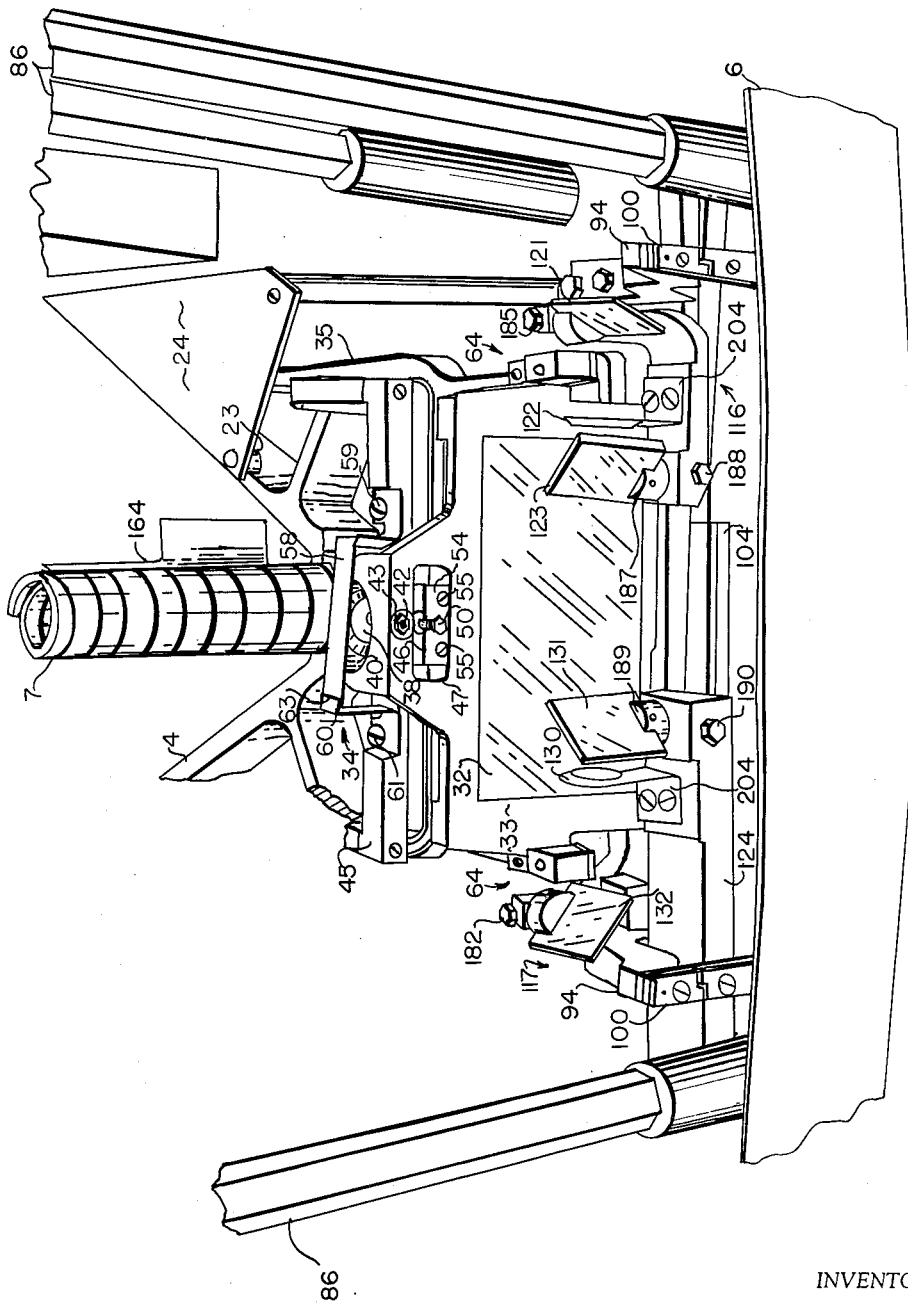

May 22, 1962 L. S. WILLIAMS 3,035,649
LEVER CONNECTION
Filed April 29, 1957 7 Sheets-Sheet 6
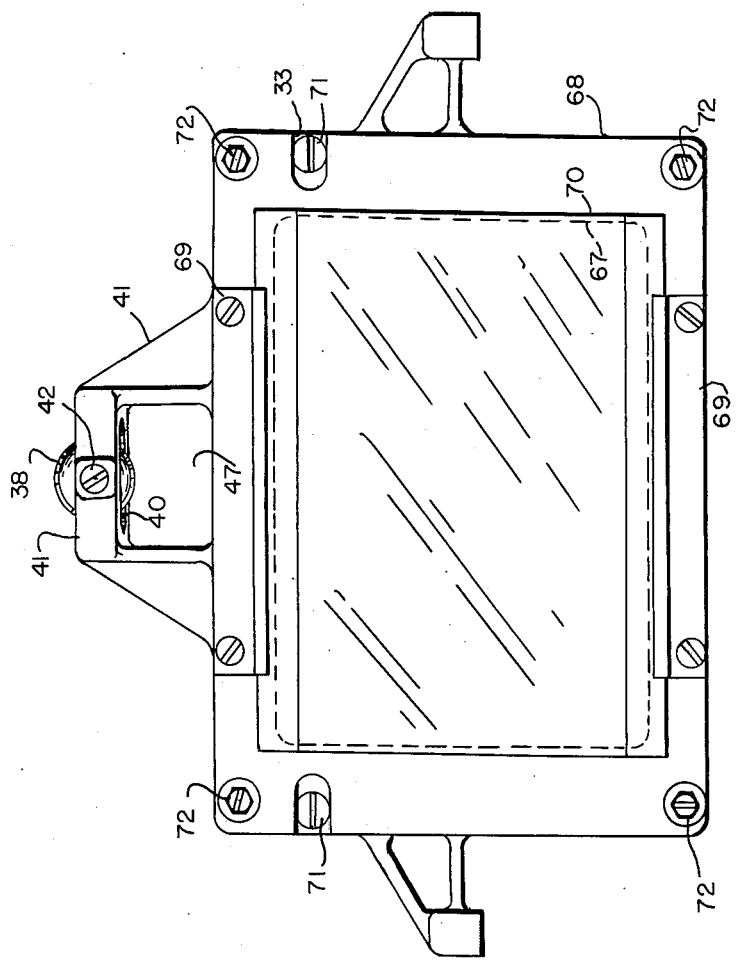
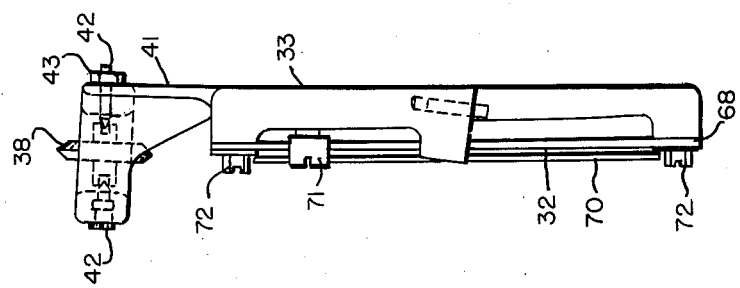
INVENTOR.
LAWRENCE S. WILLIAMS
BY
Marshall, Marshall & Yeasting
ATTORNEYS May 22, 1962 L. S. WILLIAMS 3,035,649
LEVER CONNECTION
Filed April 29, 1957 7 Sheets-Sheet 7
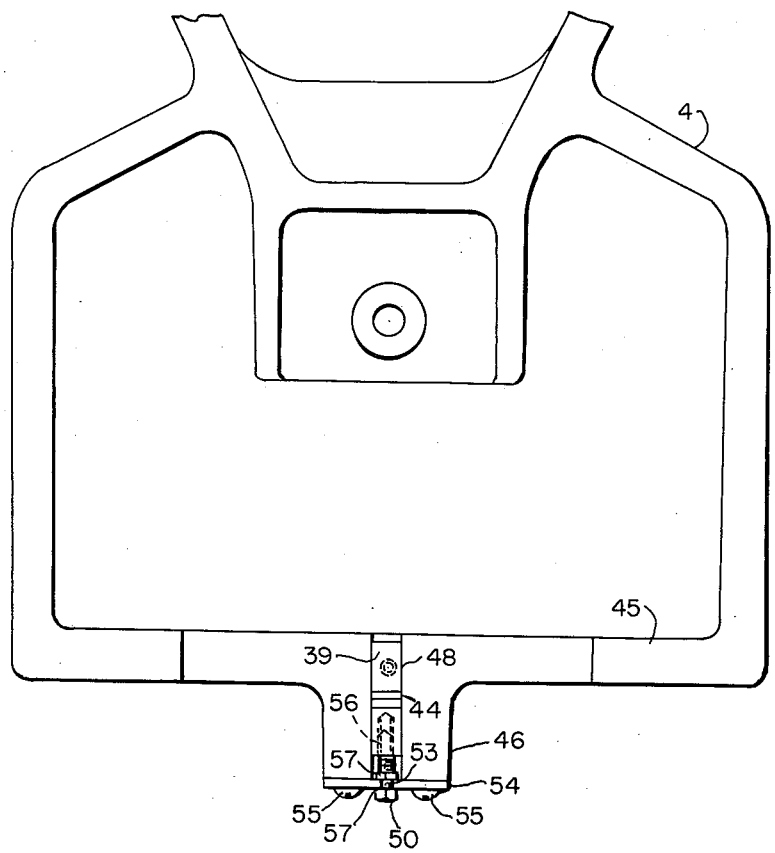
Fig. IX
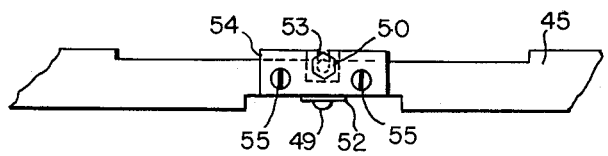
Fig. X
INVENTOR.
LAWRENCE S. WILLIAMS
BY
Marshall, Marshall & Yeasting
ATTORNEYS

United States Patent Office 3,035,649
Patented May 22, 1962

3,035,649
LEVER CONNECTION
Lawrence S. Williams, Toledo, Ohio, assignor, by mesne assignments, to Toledo Scale Corporation, Toledo, Ohio, a corporation of Ohio
Filed Apr. 29, 1957, Ser. No. 655,555
5 Claims. (Cl. 177—178)

This invention relates to weighing scales and more particularly to connections for levers in weighing scales.

In projected indication weighing scales, greatly enlarged images of indicia on a chart movable in response to a pivotally mounted lever are projected by means of an optical system onto a display screen to be read by the scale operator and/or the customer. The end of a pivotally mounted lever moves in an arc and, therefore, in order to keep the focus of the optical system from being effected by the arcuate movement of the lever, many projected indication scales, heretofore, have included complicated linkages between the lever and the chart to drive the chart in a straight path. Since such images are greatly enlarged, small imperfections in such linkages, which may arise from dirt deposits and wear during use, are greatly magnified by the optical system and may appear as significant errors in the weighing results.

Chart drive linkages in projected indication weighing scales can be eliminated by mounting the indicia-bearing chart directly on the lever and by providing means for automatically focusing the optical projection system to compensate for the arcuate path of the chart which moves in the arcuate path of the lever as disclosed and claimed in copending application Serial No. 643,693 now Patent No. 2,937,862 issued on May 24, 1960 of Lawrence S. Williams.

It is highly desirable that the indicia-bearing chart be so mounted from the lever that eccentric loading of the lever, i.e., a moment, caused, for example, by loads being placed on a side of a load receiving platter carried by the lever does not result in movement of the chart out of its normal path. Since the images of the indicia are greatly enlarged, any sideways or twisting movement of the chart due to a sideways thrust upon the lever is greatly magnified and may appear as a significant error in the weighing results.

It is accordingly, the principal object of this invention to provide improved connections for levers in weighing scales.

Another object of the invention is to provide, in projected indication weighing scales having indicia-bearing charts movable in response to movements of pivotally mounted levers, means for absorbing horizontal movements of the levers so that such movements will not disturb the charts.

A further object is the provision of an improved projected indication weighing scale of rugged, low cost construction.

Still another object is the provision of a three-point mounting for indicia-bearing charts that supports the charts on the levers of projected indication weighing scales.

Other objects and advantages will be apparent from the following description of a preferred form of the invention.

According to the invention, the improved lever connection, which is especially useful in projected indication weighing scales, includes a wheel that may be used to floatingly support a chart in a V-bearing on the lever. The wheel turns to absorb horizontal movements of the lever so that such movements will not disturb the chart.

A preferred embodiment of the invention is illustrated in the accompanying drawings.

In the drawings:

FIGURE I is a side elevational view of a projected indication weighing scale, parts being broken away and parts being shown in section for clarity of illustration;

FIGURE II is generally a vertical central sectional view as seen from a position at the far side of the weighing scale which is illustrated in FIGURE I, the upper part of the scale and certain adjuncts being broken away for clarity of illustration;

FIGURE III is an enlarged detailed view of the lever connection which is illustrated in FIGURE II;

FIGURE IV is a perspective view as seen from a position slightly to the left and above FIGURE II looking down into the base of the scale;

FIGURE V is a perspective view of the upper part of the weighing scale with its housing removed to reveal inner details;

FIGURE VI is a perspective view of the back of the scale as seen from a position to the right of FIGURE II looking toward the scale;

FIGURE VII is a front elevational view of the chart assembly as seen from the line VII—VII of FIGURE II looking in the direction indicated by the arrows;

FIGURE VIII is an end elevational view of the chart assembly which is shown in FIGURE VII;

FIGURE IX is a fragmentary plan view of the weighing scale's main lever; and

FIGURE X is a fragmentary end elevational view of the lever which is shown in FIGURE IX.

These specific figures and the accompanying description are intended merely to illustrate the invention and not to limit its scope.

Referring to FIGURES I–VI, the force of gravity acting on a load placed upon a load receiver or platter 1 is transmitted through a spider 2 and load bearings 3 to a second class main lever 4 fulcrumed on bearings 5 in a base 6 of a projected indication weighing scale which is illustrated and described in detail in the hereinbefore referred to copending application Serial No. 643,693. These load forces acting on the lever 4 are transmitted to a helical load counterbalancing spring 7 which is connected at its upper end through a calibrator clamp 8 to a frame 9 of the scale and at its lower end through a second calibrator clamp 10 to the end of the lever. The weighing mechanism, i.e., the spring 7, is movable with the lever 4 and movable relative to the frame 9. Preferably, the spring 7 is a flat-sided spring that is generally rectangular in cross section. Instead of the single counterforce 7, several springs may be used in parallel or the spring counterforce may be divided into several sections by an intermediate strut.

The pivotal connections for connecting the lever 4 to the spider 2 and to the base 6 of the scale include the ball bearings 3 and 5 instead of the usual knife edges and V-bearings to eliminate friction, and to aid in maintaining the optical projection systems in focus. Each of the pivotal connections comprises a stud 11 that is positioned in a transverse groove 12 milled in the lever 4 and clamped by a cover plate 13 attached to the lever by means of a pair of screws 14. The studs 11 extend laterally either side of the side portions of the lever 4, there being two of the studs provided for the fulcrum axis and two provided for the load pivot axis. The studs are extended inwardly toward each other or outwardly as shown according to the available space and required lateral stability. The studs 11 engage the inner races of the ball bearings 3 and 5 mounted within cup-shaped housings 15 that are clamped in pedestals 16 (FIGURE IV) of the base 6 or in the spider 2. The bearing housings 15 are clamped in position by straps 17 fitting over the housings and held in place by screws 18.

The main lever 4 thus, is supported at its one end by the fulcrum bearings 5 and at its other end by the load counterbalancing spring 7 and the spider 2 is hung from the lever 4 by means of the load bearings 3.

The spider 2 is held in an upright position by an ordinary check link 19 one end of which is pivotally connected by means of ball bearings to a leg 20 (FIGURE II) of the spider 2 and the other end of which is pivotally mounted by means of ball bearings in an adjustable pedestal 21 (FIGURES II and IV) in the base 6 of the scale. In order that the scale shall weigh accurately for all positions of a load thereupon, it is necessary that the effective length of the check link 19 shall be exactly equal to the distance between the fulcrum axis and the load pivot axis of the lever 4 and that the check link be exactly parallel to the pivot line of the lever for all positions occupied by the lever during normal weighing operations. Such positions occupied by the lever are limited by a lower rubber stop 22 attached to the base 6 of the scale and by an upper rubber stop 23 attached to a stationary platform 24 erected from the base which limit stops may engage the lever at the extreme ends of its range of travel.

A dash pot 25 is mounted on the base 6 of the scale and has its plunger 26 pivotally connected to an arm 27 extending from the spider 2. The dash pot 25 serves to prevent continued oscillation of the lever system following a change in load.

The load receiver or platter 1 is removably mounted on four posts 28 erected from the spider 2. The upper parts of two of the posts 28 have circular grooves 29 therearound and the other posts 28 have cylindrical depressions 30 in their upper ends. A pair of clips 31 (FIGURE I) on the bottom of the platter 1 engage the circular grooves 29 and a pair of tenons (not shown) also on the bottom of the platter 1 fit into the cylindrical depressions 30. In order to remove the platter from the scale, the front end of the platter is elevated to lift the tenons from the depressions and the platter is moved forward to clear the clips 31 from the posts.

A member or chart 32, which carries appropriate indicia with respect to weight, unit price and computed value of the material to be weighed on the scale, is mounted on a generally rectangular frame 33 which is connected to the spring supported end of the lever 4 by the lever connection 34 of the invention and to the end of a chart lever 35 by a pair of flexure ribbons 36, the chart lever 35 being pivotally attached in turn at its other end to the base of the scale by a second pair of flexure ribbons 37. Greatly enlarged images of the indicia on the chart, which is movable with the levers 4 and 35, are projected by means of the optical system onto a display screen to be read by the scale operator and/or the customer.

The lever connection 34 and the pair of flexure ribbons 36 provide a three-point mounting for the chart 32, the lever connection, one of the features of the weighing scale, absorbing horizontal movements of the lever 4 so that such movements will not disturb the chart 32. Since the images of the indicia on the chart 32 are greatly enlarged by the optical system, any sideways or twisting movement of the chart due to a sideways thrust upon the lever 4 is greatly magnified and may appear as significant error in weighing results. Such sideways thrust upon the lever 4 may be caused, for example, by eccentric loading of the lever by loads being placed at one side of the platter 1 which is supported by the lever. It is highly desirable that a moment produced by eccentric loading of the platter 1 shall not result in movement of the chart 32 out of its normal generally up and down path.

Absorption of the horizontal movements of the lever 4 so that such movements will not disturb the chart 32 is accomplished by the turning of a wheel 38 of the lever connection 34 that floatingly supports the chart 32 in a V-bearing 39 on the lever 4. The wheel 38 is supported in an opening 40 in an upstanding extension 41 of the chart frame 33 for rotation between the ends of opposed cone-pointed screws 42 that are threaded through the extension 41, the right-hand screw 42, as viewed in FIGURE III, being held in adjusted position by a lock nut 43. The weight of the chart frame 33 and the parts associated therewith hold the wheel 38 down under the influence of gravity in a V-notch 44 in the bearing 39.

Referring to FIGURES IX and X in particular, the lever 4 includes a transverse portion 45 having an extension 46 that protrudes horizontally through a hole 47 (FIGURES VI and VII) in the upstanding extension 41 of the chart frame 33. A groove 48 in the extension 46 of the lever 4 functions to slidably receive the V-bearing 39 which is adjustably held in the groove 48 by means of a pair of screws 49 and 50. The screw 49 extends through a hole 51 (FIGURE III) in the transverse portion 45 of the lever in a sloppy fit and is threaded into the V-bearing 39, a washer 52 keeping the head of the screw 49 out of the hole. The screw 50 is an adjustment screw of the shoulder type which fits within a collar 53 in a retaining plate 54, attached to the extension 46 of the lever portion 45 by a pair of screws 55, and which has an end 56 threaded into the V-bearing 39. When the adjustment screw 50 is turned, shoulder portions 57 of the screw 50 prevent it from moving axially and the threaded end 56 of the screw pushes or pulls the V-bearing 39 to the left or to the right, respectively, as viewed in FIGURE III to locate the V-notch 44 relative to the periphery of the wheel 38. Such movement of the bearing is permitted by the sloppy fit of the screw 49 in the hole 51, the screw 49 moving back or forth horizontally in the hole 51 as the bearing is shifted.

There, thus, is provided, in a weighing scale, an improved lever connection that has means for absorbing horizontal movements of the lever so that such movements will not disturb a chart hung from the lever, such movements being caused, for example, by moments produced by eccentric loading of the scale.

The wheel 38 which, as hereinbefore described, is floatingly held in the V-notch 44 by gravity is prevented from accidently being jolted out of the V-notch by means of a limit stop spring 58 that has one end attached at 59 to the portion 45 of the lever 4. The free end of the spring 58 is so held by a resilient lock member 60, attached to the portion 45 of the lever 4 at 61, that the spring 58 is positioned in juxtaposition with, but never touching normally, the periphery of the wheel 38. As illustrated in FIG. III, the distance between the wheel 38 and the spring 58 is less than the depth of the V-notch 44.

The spring 58 and the lock member 60 function additionally to help lock the scale for shipment by immobilizing the wheel 38. This is accomplished by pressing the free end of the spring 58 down until such end is opposite to an opening 62 (FIGURE IV) in the lock member 60, the resilient lock member 60 automatically moving, when the spring 58 is so positioned, to the right as viewed in FIGURE VI so that the free end of the spring 58 is caught in the opening 62 in the lock member. In such position, the spring 58 contacts the periphery of the wheel 38 holding it firmly down in the V-notch 44. The wheel 38 is unlocked by moving the lock member 60 to the left by finger pressure, as viewed in FIGURE VI, until the end of the spring 58 is free. Such free end of the spring 58 then automatically springs up until it is caught by an end 63 of the lock member 60.

The flexure ribbons 36 and 37 may be protected by limit stop guards 64 to prevent them from buckling under unusual forces. Each of the guards 64 includes a pair of clamp members 65 on one side of the flexure ribbon and another pair of clamp members on the other side of the flexure ribbon, the clamp members in each pair of members being spaced slightly from each other and being slightly relieved adjacent the bending area of the flexure ribbon to permit the flexure ribbon to bend without touching the guard within limits. Screws 66 which hold the clamp members together and which also attach the clamp members to the several points in the scale also serve to hold the flexure ribbons between the clamp members in sandwiched form.

Referring to FIGURES VII and VIII in particular, FIGURE VII being a view looking into the front of the chart 32 in contrast to FIGURE VI which is a view looking into the back of the chart, the chart 32 is clipped over a large opening 67 in a rectangular plate 68 by clips 69, there being a glass cover 70 between the clips and the chart to protect it. The chart 32, the cover 70 and the plate 68 make up a chart assembly which is first adjustably attached during assembly of the scale to the chart frame 33 by a pair of eccentric screws 71 and positioned by means of the screws 71 to locate the chart 32 square with the motion of the scale and then fixedly attached to the chart frame 33 by four clamp screws 72.

Referring to FIGURE II in particular, the main lever 4 and the chart lever 35 form the opposite sides of a parallelogram 73 in all positions occupied by the levers during normal weighing operations. The main lever side of the parallelogram 73 is represented by the broken line 74 which is drawn from the center of the fulcrum axis stud 11 to the lowest point on the periphery of the wheel 38 and the chart lever side of the parallelogram is represented by the broken line 75 which is drawn from the axis of flexure of the chart lever flexure ribbon 37 through the axis of flexure of the chart frame flexure ribbon 36. The plane of the indicia-bearing chart 32 forms the right-hand side of the parallelogram 73 as viewed in FIGURE II and the left-hand side is represented by the broken line 76 which is drawn from the center of the fulcrum axis stud 11 through the axis of flexure of the chart lever flexure ribbon 37. The indicia-bearing chart 32 moves in an arcuate path such that the chart has a component of motion normal to its face along with the ends of the pair of levers 4 and 35. The plane of the chart 32, because of the parallelogram geometry, in any position in its arcuate path is parallel to the plane of the chart in any one of its other positions in the path. This helps in maintaining the optical projection system in focus.

It will, of course, be understood that various details of construction may be varied over a wide range without departing from the principles of this invention, and it is therefore not the purpose to limit the patent granted hereon otherwise than necessitated by the scope of the appended claims.

Having described the invention, I claim:

1. A projected indication weighing scale comprising, in combination, a pivotally mounted lever movable about a generally horizontal pivot axis in response to changes in load, an indicia-bearing chart generally parallel to the pivot axis of the lever and movable with the lever, a lever connection connecting the chart to the lever, the lever connection including a bearing carried by the lever and a wheel resting on the bearing for rolling action generally parallel to the pivot axis of the lever and mounted on the chart for rotation about a generally horizontal axis, said lever connection absorbing generally horizontal movements of the lever so that such movements do not disturb the chart, and an optical system for projecting images of the indicia on the chart.

2. A projected indication weighing scale according to claim 1 wherein the bearing defines a groove, the wheel rests in the groove, and means are provided for shifting the bearing relative to the wheel to locate the groove relative to the wheel.

3. In a projected indication weighing scale, in combination, a pivotally mounted lever member movable about a generally horizontal pivot axis in response to changes in load upon the scale, an indicia-bearing chart member generally parallel to the pivot axis of the lever member and movable with the lever member, a lever connection connecting the members, the lever connection including a bearing on a member and a wheel mounted on the other member for rotation about a generally horizontal axis and received by the bearing for rolling action generally parallel to the pivot axis of the lever member, said lever connection absorbing generally horizontal movements of the lever member so that such movements do not disturb the chart member, and an optical system for projecting images of the indicia on the chart member.

4. A projected indication weighing scale according to claim 3 wherein the bearing defines a groove, the wheel is received in the groove, and means are provided for shifting the bearing relative to the wheel to locate the groove relative to the wheel.

5. In a projected indication weighing scale, in combination, a pivotally mounted lever member movable about a generally horizontal pivot axis in response to changes in load upon the scale, an indicia-bearing chart member located generally in a vertical plane and movable with the lever member, a lever connection connecting the members, the lever connection including a bearing on a member and a wheel mounted on the other member for rotation about a generally horizontal axis and received by the bearing for rolling action generally parallel to the pivot axis of the lever member, said lever connection absorbing generally horizontal movements of the lever member so that such movements do not disturb the chart member, and an optical system for projecting images of the indicia on the chart member.

UNITED STATES PATENTS

References Cited in the file of this patent

| | | |
|---|---|---|
| 1,357,731 | Schaper | Nov. 2, 1920 |
| 1,432,885 | Schaper | July 25, 1922 |
| 1,835,223 | Kilper | Dec. 8, 1931 |
| 1,856,411 | Carroll | May 3, 1932 |
| 2,066,624 | Hem | Jan. 5, 1937 |
| 2,622,867 | Williams | Dec. 23, 1952 |
| 2,689,120 | Reussenzehn | Sept. 14, 1954 |
| 2,723,113 | Meeker et al. | Nov. 8, 1955 |